United States Patent [19]

Nelson

[11] Patent Number: 4,582,179
[45] Date of Patent: Apr. 15, 1986

[54] CENTRIFUGAL BRAKE ASSEMBLY

[75] Inventor: Bertel S. Nelson, Naperville, Ill.

[73] Assignee: Wedgtrac Corporation, Yorkville, Ill.

[21] Appl. No.: 488,365

[22] Filed: Apr. 25, 1983

[51] Int. Cl.[4] .......................................... B65H 75/48
[52] U.S. Cl. ..................... 188/184; 74/785;
185/39; 254/267
[58] Field of Search ................. 188/64, 65.1, 65.2,
188/80, 180, 184, 185; 187/38; 192/6 A, 103 B,
105 BA; 74/785, 805, 804; 182/234, 239;
185/39; 254/267

[56] References Cited

U.S. PATENT DOCUMENTS

| | | | |
|---|---|---|---|
| 1,500,943 | 7/1924 | Jolkovski | 182/239 X |
| 2,382,482 | 8/1945 | Henry | 74/804 |
| 2,520,282 | 8/1950 | Henry | 74/804 |
| 2,761,650 | 9/1956 | Faugier | 254/267 X |
| 2,851,893 | 9/1958 | Putz | 192/105 BA |
| 2,896,912 | 7/1959 | Faugier et al. | 188/185 |
| 2,991,865 | 7/1961 | Wilson | 192/105 BA |
| 3,160,032 | 12/1964 | Black | 74/804 |
| 3,696,901 | 10/1972 | Henry | 192/105 BA |
| 4,216,848 | 8/1980 | Shimodaira | 188/184 X |
| 4,338,831 | 7/1982 | Rodaway | 74/805 |
| 4,416,430 | 11/1983 | Totten | 182/239 X |

FOREIGN PATENT DOCUMENTS 2528410 1/1977 Fed. Rep. of Germany ...... 182/239

Primary Examiner—Bruce H. Stoner, Jr.
Assistant Examiner—Richard R. Diefendorf
Attorney, Agent, or Firm—Trexler, Bushnell & Wolters, Ltd.

[57] ABSTRACT

A speed governing mechanism is provided utilizing plano-centric gearing and centrifugal braking. An outer cylindrical member serves as a cable drum and is rotated by playing out of the cable. A central shaft is fixedly mounted for supporting the assembly. Plano-centric gearing within the outer cylindrical member turns an inner rotary member on the fixed shaft at an increased speed, while a centrifugal brake assembly is fixed on the inner member and has brake shoes that fly outwardly under centrifugal force to bear against an inner cylindrical reaction surface on the outer cylinder, and thereby to limit the speed of rotation of the outer cylinder. Guides are provided coacting with the brake shoes to cause them to move rearwardly relative to the direction of rotation, and thereby to provide a wedging action with the reaction surface.

4 Claims, 3 Drawing Figures

CENTRIFUGAL BRAKE ASSEMBLY

BACKGROUND OF THE INVENTION

Retarding mechanisms for rotary devices are needed in many installations. By way of specific example, draft beer is often supplied in stainless steel kegs which are rather expensive and which must be reused many times in order to be cost effective. It is common practice to unload such kegs of beer from a truck by placing a rubber pad on the pavement, which may be concrete, and then dropping the kegs onto the pad. Notwithstanding the pad a keg may land on an edge where area forces may be quite high, resulting in denting or other damage to the keg. Furthermore, the driver or other delivery men may be rushed and may occasionally miss the pad with a keg, resulting in severe damage to the keg. Damage may also be incurred if the keg bounces off the pad onto the concrete.

A keg can be lowered from the back of a truck by a sling on a cable passed over a pulley arrangement. However, it is undesirable to have the cable and pulley arrangement operated manually as this slows operations and increases labor costs. If some sort of speed retarder mechanism could be utilized in such a system time delay would be minimized and labor costs would not be increased.

Retarders also can find use in conveyor pulleys to control the speed of a belt conveying material down a slope, or they can be used as speed limiters or governors.

OBJECTS AND SUMMARY OF THE PRESENT INVENTION

It is an object of the invention to provide an improved speed limiter for a pulley device for unloading kegs of beer from the back of a truck, for example.

More particularly it is an object of the present invention to provide a centrifugal brake assembly for use in a pulley mechanism for unloading kegs of beer or the like from the back of a truck.

In attaining the foregoing and other objects of the present invention I provide a pulley or cable drum assembly having a cable wound thereon. A sling on the cable receives a keg of beer for lowering it to the ground. I provide a centrifugal brake assembly within the cable drum assembly for limiting the speed of the cable drum assembly, and thereby limiting the speed at which the beer keg is lowered to the ground. Springs in the nature of clock springs are wound up upon extending of the cable, and return the cable to raised or wound up position upon removal of the beer keg or other weight therefrom.

THE DRAWINGS

The invention will best be understood with reference to the following specification when taken in connection with the accompanying drawings wherein:

FIG. 1 comprises an axial sectional view through a cable drum assembly containing my centrifugal brake assembly in accordance with the present invention;

FIG. 2 is an end view of the centrifugal brake assembly of the present invention; and FIG. 3 is an axial sectional view therethrough as taken substantially along the line 3—3 in FIG. 2.

DETAILED DESCRIPTION OF THE PREFERRED EMBODIMENT

Figure 1:
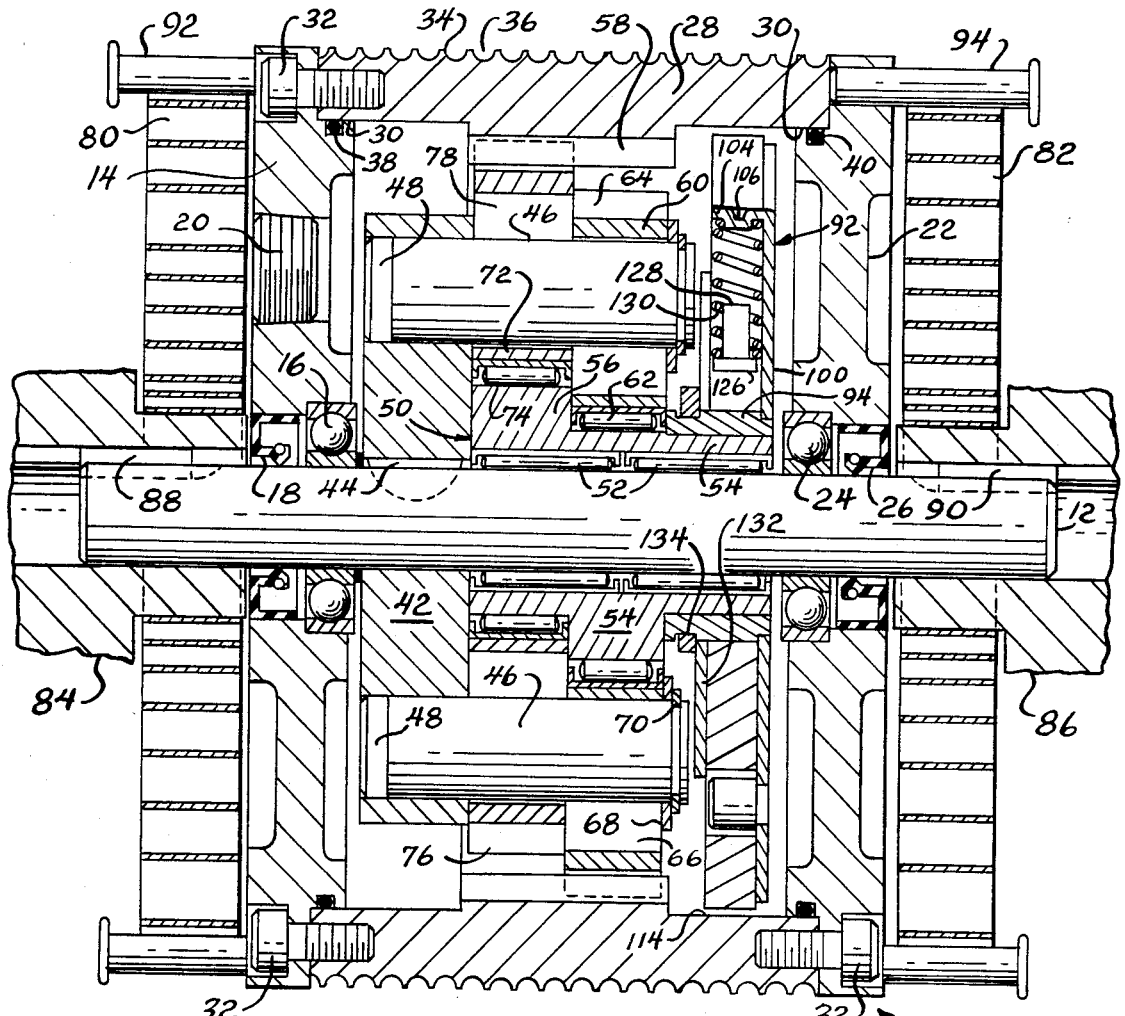

Turning now to the drawings in greater particularity there is shown in FIG. 1 a cable drum assembly 10 utilizing plano-centric gearing. A similar plano-centric gear set is commercially available as a "Hi-Range Reduction Drive", Models HR-16, HR-16F, HR-65, and HR-65F being exemplary, from Ferguson Machine Company, 11820 Lackland Road, St. Louis, Mo. 63141. Although the apparatus is referred to as a "Hi-Range Reduction Drive", the plano-centric gearing is used in the present invention as a speed increaser.

The apparatus includes a shaft 12 having a left end cover 14 journaled thereon by means of ball bearings 16 with an oil seal 18 of known construction being interposed between the left end cover and the shaft. A socket head pipe plug 20 is threaded into a suitable hole in the left end cover for addition of oil, and for checking of oil level, the interior parts as hereinafter to be described running in an oil bath.

The apparatus also includes a right end cover 22, similarly journaled by ball bearings 24 on the shaft 12 and having a similar oil seal 26. A drum 28 is secured to the end covers 14 and 22, fitting on suitable shoulders 30 thereon and secured in place by a plurality of annularly disposed bolts 32. The exterior surface of the drum 28 is formed with a spiral groove 34 therein receiving a cable 36 which preferably has a sling (not shown) on the end thereof. O-rings 38 and 40 and suitable recesses in the end covers 14 and 22 seal in the covers to the drum 28.

A pin plate 42 is mounted on the shaft 12 and is fixed thereto by a key 44. A plurality of cylindrical pins 46, for example, eight pins, is mounted in an annular array of bores 48 in the pin plate 42 and extends axially therefrom. As will be apparent, the pin plate is of lesser diameter than the end covers, and the pin plate and the pins are housed within the drum 28.

A hub 50 is journaled on the shaft 12 intermediate the ends thereof by means of two rows of needle roller bearings 52. The hub at the right end is provided with a cylindrical tubular portion 54 coaxial with the shaft 12. The hub further is provided with a first eccentric portion 55 comprising a cylinder having it axis eccentric relative to the axis of the shaft 12. The first eccentric lies immediately to the left of the coaxial hub portion 54, and further to the left is a second eccentric 56 which also comprises a cylindrical shape. The two eccentric cylinders are of the same diameter and are displaced 180 degrees from one another relative to the axis of the shaft 12.

The central portion of the drum 28 is provided with an annular row of internal gear teeth 58. An eccentric planet gear 60 is journaled on the first eccentric 55 by an assembly of needle roller bearings 62 and has external teeth 64 meshing at a particular location with the internal gear teeth 58. The eccentric planet gear 60 is provided with an annular array of cylindrical holes 66 each having a diameter approximately 150% of the diameter of a pin 46 and receiving a respective pin 46. A retainer plate 68 and snap rings 70 on the ends of the pins 46 restrain the eccentric gear against movement to the right.

An eccentric pinion gear 72 is journaled on the second eccentric 56 by means of needle roller bearings 74, and has peripheral teeth 76 meshing with the internal gear teeth 58 180 degrees from engagement of the teeth of gear 60. This gear is also provided with a circular array of cylindrical holes 78 through which the pins 46 project. These holes 78, like the holes 66, are of approximately 1½ times the diameter of the diameter of the pins 46. The gears 60 and 72 are of the same diameter and both have the same number of teeth, slightly less than the number of teeth in the internal ring gear 58. For example, the internal gear 58 may have 39 teeth, while each of gears 60 and 72 has 37 teeth.

The parts of the assembly as heretofore shown and described are similar to the Ferguson Hi-Range Reducer. One distinction is in the provision of the spiral 34 on the exterior surface of the drum 28 for receipt of the cable 36. A further departure resides in the provision of clock springs 80 and 82 adjacent opposite ends of the shaft 12 and secured to the shaft by hubs 84 and 86 keyed to the shaft at 88 and 90. These hubs comprise parts of a casting or cradle supporting the assembly, and the keys 88 and 90 fix the shaft non-rotatably to the hubs. The outer ends of the clock springs are fixed to the end plates or covers 14 and 22 respectively by flat head rivets 91 and 93. These are six rivets on each cover to position and contain the springs as well as to anchor their outer ends. When a beer keg is removed from the sling and the cable is released the clock springs rewind the drum.

Figure 2:
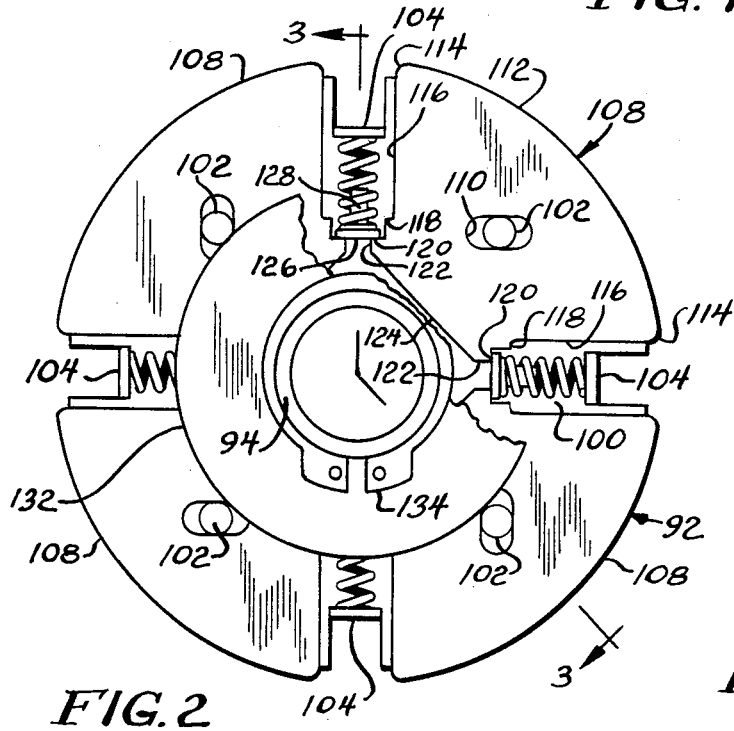
Figure 3:
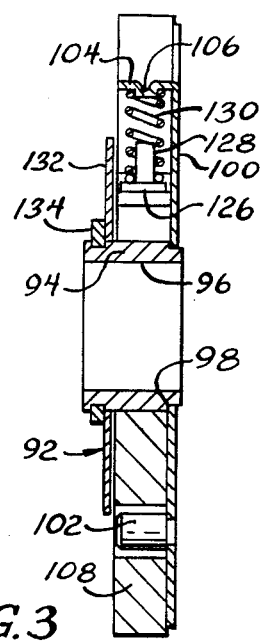

The remainder of the assembly includes a centrifugal brake assembly shown in place in FIG. 1, and shown separately for clarity of illustration in FIGS. 2 and 3. The brake assembly 92 comprises a hub 94 having a cylindrical bore 96 received on the tubular cylindrical portion 54 of the hub 50 and cemented in place. An example of a suitable cement comprises cyanoacrylate. The hub is provided with a stepped shoulder 98 and a circular brake side plate 100 is mounted on such shoulder, being staked or peened in place.

The side plate 100 is provided with four guide pins 102 spaced at 90 degrees from one another, and each about ¼ of the way in from the outer diameter of the plate to the center line of the brake assembly. These pins are staked or peened in place in accordance with known practice.

The brake side plate 100 adjacent its periphery has four tabs 104 struck from the material of the side plate and extending to the left (as viewed in FIGS. 1 and 3). The tabs are spaced at 90 degrees relative to one another, and at 45 degrees relative to the pins 102. Each tab is provided with a radially inwardly protruding dimple 106 forming a spring seat, as will be apparent hereinafter.

The brake assembly 92 further includes four identical brake shoes 108, each having a 45 degree elongated slot 110 therein received over a respective pin 102. It is important to note in FIG. 2 with a direction of rotation of the brake assembly counter-clockwise that the slots 110 are closer to the center of rotation of the assembly on the left side and farther away at the right side. The brake shoes are made of powdered iron and have arcuate outer edges 112 of substantially the same diameter as the confronting inner surface 114 of the drum 28. Each is of somewhat less than 90 degree arc with rounded end portions 114 connected to straight edges 116 parallel to radii to the adjacent tabs 104. At the bottoms the straight edges 116 are provided with two steps 118 and 120 with short edges 122 leading to a straight bottom line 124 disposed as a tangent.

Flat headed pins 126 seat on the steps 120 and have the stems 128 extending radially outwardly and centering helical compression springs 130, the outer ends of which seat on the aforesaid dimples 106.

A circular brake retaining plate 132 is disposed forwardly of or to the left of the brake shoes and springs (FIG. 3) and is held in place by a retaining ring 134 received in an annular external groove in the hub 94.

The eccentrics 55 and 56 are of equal diameter and are displaced 180 degrees from one another. Similarly, the gears 60 and 72 are of equal diameter and have the same number of teeth, but are displaced 180 degrees from one another by the eccentrics. The number of teeth 58 on the inner gear is slightly greater than the number of teeth on the eccentric gears. The speed ratio of the outer cylinder 28 and of the hub 54 comprises a ratio determined by dividing the number of teeth in the eccentric gears by the difference between the number of teeth in each eccentric gear. By way of one specific example of the present invention there are 39 teeth 58 in the inner gear, and there are 37 teeth in each of the eccentric gears 60 and 72. Thus, the ratio comprises 37 divided by two, equals 18.5.

Thus, when the outer cylinder 28 is turned by the cable 36 playing off of the outer drum the member 50 turns, as determined by the reaction forces among the various gear teeth and the eccentrics at a speed 18.5 times the speed of the outer cylinder. The centrifugal brake assembly turns with the member 50, and the brake shoes move outwardly under centrifugal force against the cylindrical surface 114 of the outer cylinder 28. The direction of rotation of the member 50 and of the outer cylinder 28 is the same, counter-clockwise as viewed from the left in FIG. 1. The pins 102 in the slots 110 of the brake shoes drive the shoes rotationally and tend to force these shoes outwardly when the load is lowering, thus augmenting the centrifugal action and providing more effective braking. Conversely, in the cable rewind direction of rotation the pins will tend to draw the brake shoes inward toward the center and free of the cylindrical surface 114, thereby permitting the rewind springs to function with less resistance. The braking action tends to slow the inner member 50 relative to the outer cylinder 28, and thus places a limit on the speed of the outer member 28, and safely lowers a beer keg or the like at a controlled rate.

As noted, essentially the same mechanism can be utilized for speed governing as in conveyor systems and many other applications in which it is desired to provide a speed limiter or governor. The specific example of the invention as herein shown and described is for illustrative purposes. Various changes in structure will no doubt occur to those skilled in the art and will be understood as forming a part of the present invention insofar as they fall within the spirit and scope of the appended claims.

The invention is claimed as follows:

1. A centrifugal brake assembly comprising: hub means mountable on a rotatable member, a plurality of brake shoes, means mounting said brake shoes from said hub means for rotation therewith and for movement of said brake shoes toward and away from said hub means, and resilient means acting between said mounting means and said brake shoes biasing said brake shoes in toward said hub means, said brake shoes moving centrifugally outwardly against the action of said resilient means and away from said hub means upon rotation of said hub means and said brake shoes, said mounting means including means for moving said brake shoes rearwardly relative to the direction of rotation to effect a wedging action between said brake shoes and a retarding surface engaged by said brake shoes, said rearwardly moving means comprising guide means at an acute angle to a radius extending outwardly from said hub means through said guide means and coacting with centrifugal force to move said shoes rearwardly.

2. A brake assembly as set forth in claim 1 wherein said mounting means comprises a plate fixed to said hub means and having a plurality of pins projecting therefrom axially of said hub means, and a slot in each of said brake shoes, said pins and slots comprising the rearwardly moving means.

3. A brake assembly as set forth in claim 2 wherein a pair of adjacent brake shoes have confronting spring seats, said resilient means comprises a plurality of compression springs, and wherein a single spring seats against the confronting spring seats of a pair of brake shoes.

4. A centrifugal brake assembly comprising: hub means mountable on a rotatable member, a plurality of brake shoes, means mounting said brake shoes from said hub means for rotation therewith and for movement of said brake shoes toward and away from said hub means, and resilient means acting between said mounting means and said brake shoes biasing said brake shoes in toward said hub means, said brake shoes moving centrifugally outwardly against the action of said resilient means and away from said hub means upon rotation of said hub means and said brake shoes, said mounting means including means for moving said brake shoes rearwardly relative to the direction of rotation to effect a wedging action between said brake shoes and a retarding surface engaged by said brake shoes, said rearwardly moving means comprising guide means at an acute angle to a radius extending outwardly from said hub means through said guide means and coacting with centrifugal force to move said shoes rearwardly, said mounting means comprising a plate fixed to said hub means, a plurality of pins projecting from said plate axially of said hub means and a slot in each of said brake shoes, said pins and slots comprising the rearwardly moving means, each pair of adjacent brake shoes having confronting spring seats, said resilient means comprising a plurality of compression springs, a single such spring seating against the confronting spring seats of a pair of brake shoes and further including a plurality of tabs struck from said plate and forming seats for the opposite ends of said springs.

* * * * *